US012267467B2

(12) United States Patent
Akita

(10) Patent No.: US 12,267,467 B2
(45) Date of Patent: Apr. 1, 2025

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Kohei Akita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/376,488

(22) Filed: Oct. 4, 2023

(65) Prior Publication Data

US 2024/0146850 A1    May 2, 2024

(30) Foreign Application Priority Data

Oct. 26, 2022 (JP) .................. 2022-171422

(51) Int. Cl.
*H04N 1/00* (2006.01)
(52) U.S. Cl.
CPC ................ *H04N 1/00214* (2013.01)
(58) Field of Classification Search
None
See application file for complete search history.

(56) References Cited

U.S. PATENT DOCUMENTS

| 10,305,961 B2 | 5/2019 | Yasuhara | |
|---|---|---|---|
| 2007/0088737 A1* | 4/2007 | Kawakami | G06F 21/50 707/999.102 |
| 2010/0138655 A1* | 6/2010 | Matsui | H04L 63/0442 713/168 |
| 2011/0093921 A1* | 4/2011 | Tsujimoto | G03G 21/02 726/3 |
| 2011/0246644 A1* | 10/2011 | Hamada | H04L 43/0811 709/224 |
| 2012/0079042 A1* | 3/2012 | Tsurumi | H04L 51/00 709/206 |
| 2013/0002540 A1* | 1/2013 | Ajitomi | G06F 16/9538 345/156 |
| 2015/0281019 A1* | 10/2015 | Hashizume | H04L 41/147 709/224 |

(Continued)

FOREIGN PATENT DOCUMENTS

| JP | 2004185445 | * | 7/2004 | ............. G06F 3/14 |
|---|---|---|---|---|
| JP | 2010124385 | * | 6/2010 | ............. H04N 7/173 |
| JP | 2013123183 | * | 6/2013 | ............. H04M 1/00 |

(Continued)

*Primary Examiner* — Beniyam Menberu
(74) *Attorney, Agent, or Firm* — VENABLE LLP

(57) ABSTRACT

An image processing apparatus, communicable with a first server and a second server, obtains, from the first server, transmission possibility information indicating transmission possibility of operation information on the image processing apparatus, wherein the transmission possibility information of the operation information is set in the first server according to a screen category displayed on the image processing apparatus, and transmits operation information in a screen category corresponding to the allowance of the transmission to the second server on a condition that the obtained transmission possibility information indicates the transmission is allowed.

17 Claims, 16 Drawing Sheets

(56) References Cited

U.S. PATENT DOCUMENTS

2020/0151345 A1* 5/2020 Chauhan ................. G06F 21/16
2020/0162631 A1* 5/2020 Tsuchiya ............. G06F 11/0733

FOREIGN PATENT DOCUMENTS

| JP | 2014137802 | * | 7/2014 | ............. G06F 21/31 |
| --- | --- | --- | --- | --- |
| JP | 2016-081345 A | | 5/2016 | |
| JP | 2016177572 | * | 10/2016 | ............. G03G 21/00 |
| JP | 2019004386 | * | 1/2019 | ............. B41J 29/38 |
| JP | 2021057864 | * | 4/2021 | ............. G03G 21/00 |
| KR | 20090047846 | * | 5/2009 | ......... H04N 21/8166 |

* cited by examiner

| SETTING ITEM OF TRANSMISSION POSSIBILITY INFORMATION | APPLICATION | EXAMPLE OF VALUE |
|---|---|---|
| MODEL YEAR | STOP TRANSMITTING INFORMATION ON MODEL RELEASED YEARS AGO | 22AU_ON, 23SP_OFF |
| PANEL TYPE | CONTROL MODEL THAT PERFORMS TRANSMISSION DEPENDING ON TYPE OF MOUNTED LIQUID CRYSTAL | COLOR_LCD_ON, MONO_LCD_OFF |
| CLIENT ID (SERIAL NUMBER OF PRINTER) | THIN OUT DEVICE THAT PERFORMS TRANSMISSION | EVEN, ODD |
| FORCED OFF | STOP TRANSMISSION OF ALL DEVICES | ON, OFF |
| ON/OFF FOR EACH ELEMENT | CONTROL WHETHER TO PERFORM TRANSMISSION FOR EACH ELEMENT THAT PERFORMS INFORMATION TRANSMISSION | UI_ON, APL_OFF |
| TRANSMISSION POSSIBILITY DEPENDING ON SCREEN CATEGORY | CONTROL WHETHER TO TRANSMIT OPERATION INFORMATION DEPENDING ON CATEGORY OF DISPLAYED SCREEN | COPY_ON, SCAN_OFF, SEETING_ON |

FIG.5

| TYPE OF OPERATION INFORMATION | NECESSARY PARAMETER | TAG NAME | APPLICATION | EXAMPLE OF VALUE |
|---|---|---|---|---|
| CLIENT ID | ○ | clientId | UNIQUE VALUE INDICATING MFP | - |
| LANGUAGE SETTING | ○ | language | LANGUAGE SETTING SET IN MFP | Japanese, English |
| SCREEN ID | × | screenId | IDENTIFIER OF SCREEN DISPLAYED ON MFP | ID_T0001, ID_T1001 |
| MODEL | ○ | model | RELEASE YEAR OF MFP | 22AU, 23SP |
| EVENT | × | event | DETAILS OF OPERATION PERFORMED BY USER | hagaki, back_button |

FIG.6

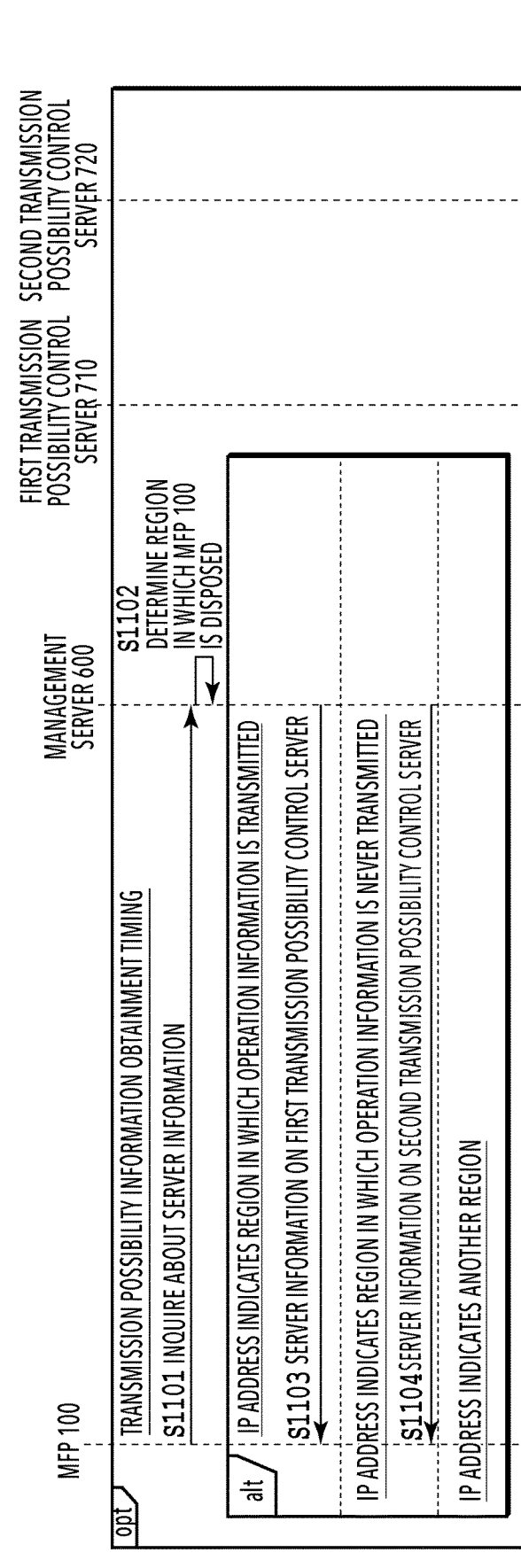

| SETTING ITEM OF TRANSMISSION POSSIBILITY INFORMATION | APPLICATION | EXAMPLE OF VALUE |
|---|---|---|
| MODEL YEAR | STOP TRANSMITTING INFORMATION ON MODEL RELEASED YEARS AGO | 22AU_ON, 23SP_OFF |
| PANEL TYPE | CONTROL MODEL THAT PERFORMS TRANSMISSION DEPENDING ON TYPE OF MOUNTED LIQUID CRYSTAL | COLOR_LCD_ON, MONO_LCD_OFF |
| CLIENT ID (SERIAL NUMBER OF PRINTER) | THIN OUT DEVICE THAT PERFORMS TRANSMISSION | EVEN, ODD |
| FORCED OFF | STOP TRANSMISSION OF ALL DEVICES | ON, OFF |
| ON/OFF FOR EACH ELEMENT | CONTROL WHETHER TO PERFORM TRANSMISSION FOR EACH ELEMENT THAT PERFORMS INFORMATION TRANSMISSION | UI_ON, APL_OFF |
| TRANSMISSION POSSIBILITY DEPENDING ON SCREEN CATEGORY | CONTROL WHETHER TO TRANSMIT OPERATION INFORMATION DEPENDING ON CATEGORY OF DISPLAYED SCREEN | COPY_ON, SCAN_OFF, SEETING_ON |
| EXPIRATION DATE | INDICATE EXPIRATION DATE OF TRANSMISSION POSSIBILITY INFORMATION | 2021/12/16, 5:00 |

FIG.12

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present disclosure relates to an information processing apparatus, a method of controlling the information processing apparatus, and a storage medium.

Description of the Related Art

There has been provided an operation analysis server configured to analyze an operation by a user. The analysis of operation information implements various improvements. This analysis function has been also introduced in a Web page, a mobile app, and the like. Japanese Patent Laid-Open No. 2016-081345 discloses a technique utilizing such an analysis system.

However, if all the operations by the user are transmitted to the server, the data size becomes large, and the operational cost of the operation analysis server is increased. Additionally, a flexible response is required to change obtainment target data.

SUMMARY OF THE INVENTION

An information processing apparatus according to an aspect of the present disclosure that is communicable with a first server and a second server includes: an obtainment unit configured to obtain, from the first server, transmission possibility information indicating transmission possibility of operation information on the information processing apparatus; and a control unit configured to perform control so as to transmit the operation information on the information processing apparatus to the second server on a condition that it is indicated that the transmission of the transmission possibility information is allowed.

Further features of the present invention will become apparent from the following description of exemplary embodiments with reference to the attached drawings.

BRIEF DESCRIPTION OF THE DRAWINGS

FIG. 5 is a diagram illustrating an example of transmission possibility information;

FIG. 6 is a diagram illustrating an example of operation information;

FIG. 11 is a diagram showing the relationship of FIGS. 11A and 11B;

FIGS. 11A and 11B are totally a sequence diagram illustrating an example of the processing by the MFP to obtain the transmission possibility information;

FIG. 12 is a diagram illustrating an example of the transmission possibility information;

DESCRIPTION OF THE EMBODIMENTS

Figure 1:
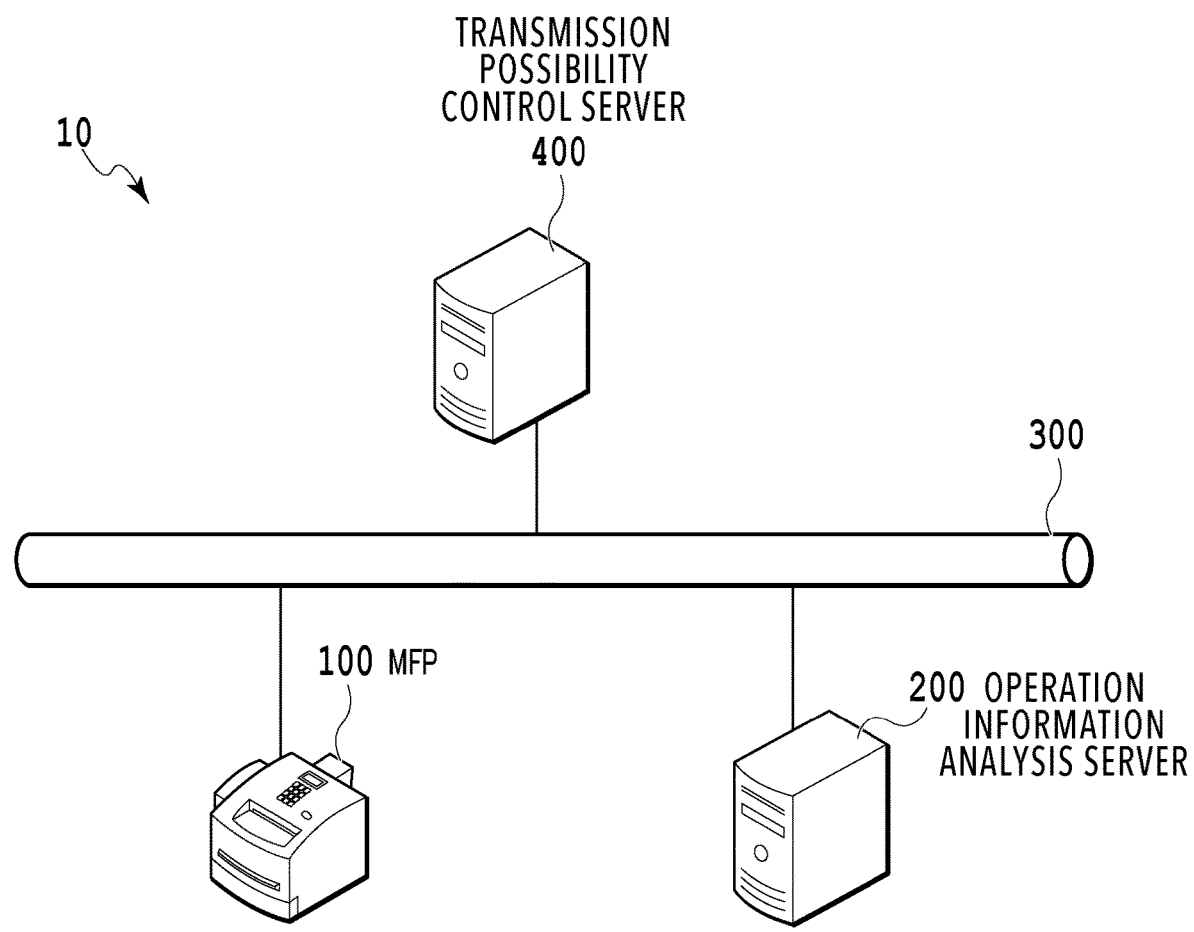
FIG. 1 is a diagram illustrating an overall configuration of an information processing system.

Favorable embodiments of the present disclosure are described in detail with reference to the appended drawings. Note that, the embodiments below are not intended to limit the matters of the present disclosure, and not all the combinations of the characteristics described in the embodiments below are necessarily required for the means for solving the problems of the present disclosure. Note that, the same configurations are described with the same reference numerals.

First Embodiment

<System Configuration>

FIG. 1 is a diagram illustrating an overall configuration of an information processing system 10 of the present embodiment. The information processing system 10 includes a multifunction peripheral (MFP) 100, an operation information analysis server 200, a transmission possibility control server 400, and a communication network 300. The MFP 100 is formed to be communicable with the operation information analysis server 200 and the transmission possibility control server 400 through the communication network 300. Note that, although each of the operation information analysis server 200 and the transmission possibility control server 400 is a single server device in the example in FIG. 1, a physical device example is not limited to this example. A configuration in which a later-described function that the operation information analysis server 200 and the transmission possibility control server 400 each have is implemented by multiple physical servers may be applicable. That is, each of the operation information analysis server 200 and the transmission possibility control server 400 may be a server system including multiple servers. Additionally, the operation information analysis server 200 and the transmission possibility control server 400 may be constructed as a virtual server in a cloud service. Moreover, the functions respectively implemented by the operation information analysis server 200 and the transmission possibility control server 400 may be implemented by a single server.

<Overview of System>

An overview of processing performed by the information processing system 10 of the present embodiment is described. The MFP 100 is a type of an information processing apparatus. As described later, the MFP 100 is provided with an operation unit that receives a user operation. In the present embodiment, operation information related to the user operation performed on the MFP 100 is transmitted from the MFP 100 to the operation information analysis server 200, and various analyses are performed by the operation information analysis server 200. For example, information such as an identifier and a button operation on a screen are transmitted from the MFP 100 to the operation information analysis server 200 as the operation information. A developer of the MFP 100 analyzes an operation flow by the user and the like and implements an improvement in the operability and the like.

In this process, in a case where all the pieces of information related to the operations performed by the user are transmitted from the MFP 100 to the operation information analysis server 200, the data size becomes large, and the operational cost of the operation information analysis server 200 is increased. For this reason, it is required to limit the operation information as an obtainment target and reduce the data size. Additionally, there may be considered a case where an analysis result of some of or all the pieces of the operation information is unnecessary because the product was released years ago, for example. In other words, there is assumed a case where the transmission of the operation information from the MFP 100 to the operation information analysis server 200 is unnecessary. In a device like the MFP 100, device control is performed by using built-in software. In a mode using such built-in software, in a case where the operation information as the target is changed or control to prevent the obtainment of the operation information itself is performed, firmware update is necessary every time. Since it is impossible to use the device during the firmware update, the user has a disadvantage.

To deal with this, in the present embodiment, control using the transmission possibility control server 400 is performed. Specifically, the transmission possibility control server 400 transmits transmission possibility information to the MFP 100 in response to an inquiry about the transmission possibility information from the MFP 100. The transmission possibility information is information indicating whether it is possible (allowed) to transmit the operation information to the operation information analysis server 200. Additionally, as described later, the operation information includes multiple operation types. Thus, the transmission possibility information is also information indicating whether it is possible (allowed) to transmit the operation information to the operation information analysis server 200 for each operation type. In other words, use of the transmission possibility information makes it possible to control the operation information transmitted from the MFP 100 in a detailed manner.

Additionally, the MFP 100 saves permission information indicating whether there is permission from the user to transmit the operation information to the outside (the operation information analysis server 200). For example, at a predetermined timing such as first activation, the MFP 100 receives from the user an instruction about whether to permit the transmission of the information to the outside. The MFP 100 saves the permission information in accordance with the instruction from the user.

Then, based on the transmission possibility information obtained from the transmission possibility control server 400 and the permission information saved in the MFP 100, the MFP 100 determines whether to transmit the operation information indicating the information on the operation of the MFP 100 by the user to the operation information analysis server 200. The operation information is transmitted from the MFP 100 to the operation information analysis server 200 on the condition that the permission information indicates that there is permission, and also the transmission possibility information indicates that the transmission of the operation information is allowed.

Note that, the transmission and reception of the information between the MFP 100 and the transmission possibility control server is performed at a transmission possibility information obtainment timing. At the transmission possibility information obtainment timing, the MFP 100 obtains the transmission possibility information from the transmission possibility control server 400.

Additionally, the transmission and reception of the information between the MFP 100 and the operation information analysis server 200 is performed at an operation information transmission timing. At the operation information transmission timing, the MFP 100 transmits the operation information to the operation information analysis server 200 based on the transmission possibility information transmitted from the transmission possibility control server 400 and the permission information saved in the MFP 100.

Note that, in each communication between the MFP 100 and the transmission possibility control server 400 and between the MFP 100 and the operation information analysis server 200, control using the HTTP, the XMPP, or the like is performed. Although an example of using the HTTP or the XMPP as the protocol is described herein, another protocol may be used.

<Block Diagram>

Figure 2:
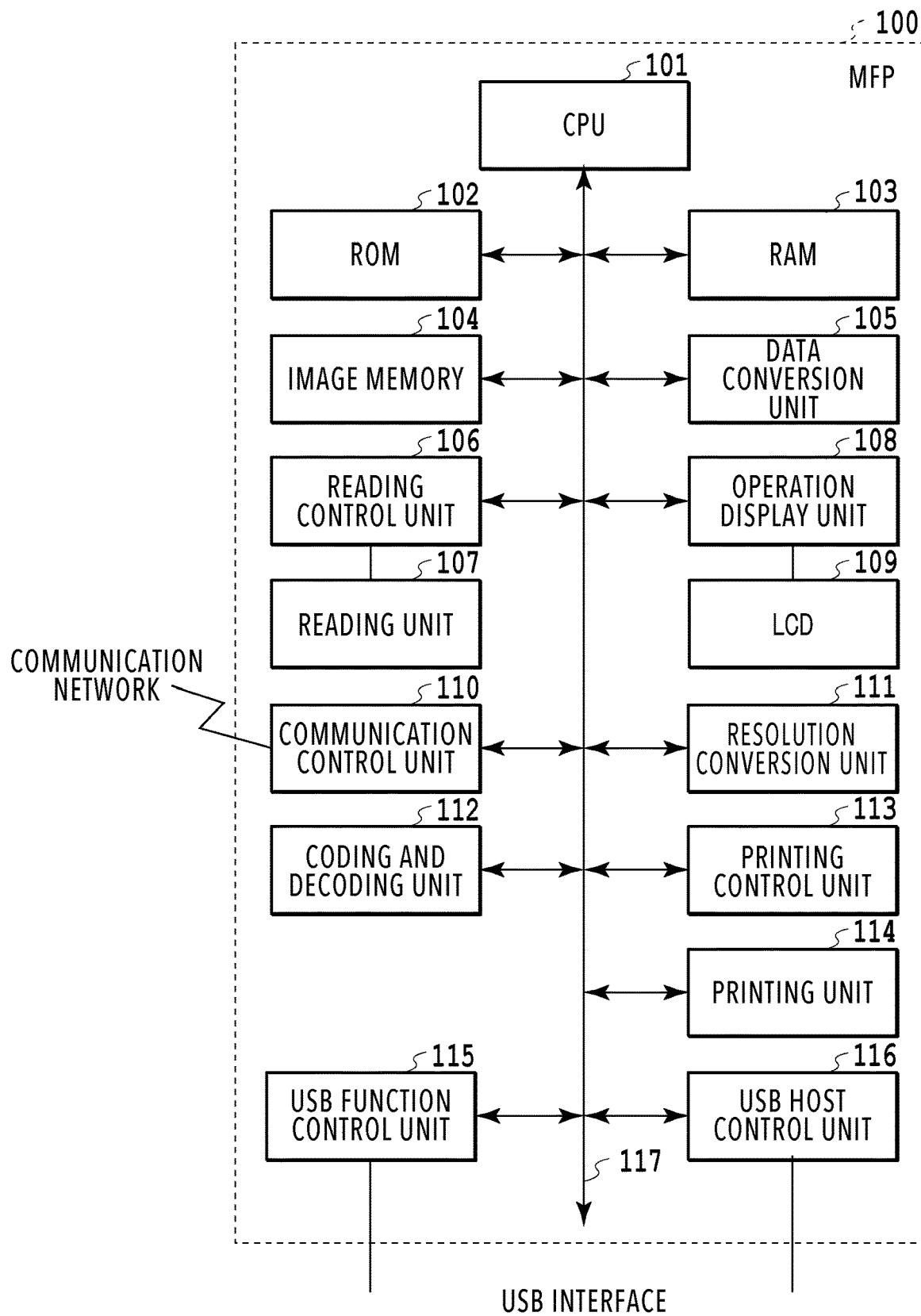
FIG. 2 is a block diagram illustrating a schematic configuration example of an MFP.

FIG. 2 is a block diagram illustrating a schematic configuration example of the MFP 100 in the present embodiment. The MFP 100 is a type of the information processing apparatus. Additionally, the MFP 100 is also a type of the image processing apparatus that processes an image. The MFP 100 of the present embodiment has an information processing function that includes, for example, generating, storing, and transmitting device information including log information and status information. Additionally, the MFP 100 has an image formation function to form an image on a printing medium by a printing control unit 113 and a printing unit 114 described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution conversion unit 111. Additionally, the MFP 100 includes a coding and decoding unit 112, the printing control unit 113, the printing unit 114, a USB function control unit 115, a USB host control unit 116, and a bus 117.

The CPU 101 is a system control unit and controls overall the MFP 100. The ROM 102 is a non-volatile memory storing fixed data such as a control program executed by the CPU 101, a data table, and an embedded operating system (OS). In the present embodiment, each control program stored in the ROM 102 is used for software execution control including scheduling, task switching, interruption processing, and the like under the management by the embedded OS stored in the ROM 102. The RAM 103 is formed of a static random access memory (SRAM) or the like that needs a backup power supply, and power feeding to the RAM 103 is guaranteed by a not-illustrated primary battery for data backup. The RAM 103 stores a program control variable and the like. Additionally, the RAM 103 stores the permission information indicating whether there is the permission to provide the device information to the outside and stores the operation information. The image memory 104 is formed of a dynamic random access memory (DRAM) and the like and can accumulate image data. Moreover, a part of the area of the image memory 104 is secured as a work area for executing software processing. The data conversion unit 105 performs conversion of the image data such as analysis of page description language (PDL) and computer graphics (CG) rasterization of character data.

The reading unit 107 optically reads a document by a CIS image sensor and converts the document to an electric image signal. The reading control unit 106 performs various types of image processing such as binarization processing and halftone processing on this image signal and outputs high-definition image data. Note that, a method of optically reading the document may be either of a sheet reading control method in which the document is read by a fixed CIS image sensor and a book reading control method in which the document fixed on a platen glass is read by a moving CIS image sensor.

The operation display unit 108 is formed of a key such as a numerical value input key, a mode setting key, a determination key, and a cancel key, a light emitting diode (LED) or seven-segment display unit, and the like. The various keys may be implemented by a so-called software key displayed on the LCD 109 and can receive an operation from the user. In a case where no operation is performed by the user for a certain period of time, the LCD 109 switches off a backlight of the LCD 109 to reduce the power consumption.

The communication control unit 110 controls the communication between the MFP 100 and the communication network 300 and establishes the connection to an Internet service provider and the communication of various data between the operation information analysis server 200 and the transmission possibility control server 400. Additionally, the communication control unit 110 can determine whether the MFP 100 is connected to the Internet or connected to only a LAN. Note that, the connection between the communication control unit 110 and the communication network 300 is established by a publicly known method such as the HTTP or the XMPP. The resolution conversion unit 111 performs resolution conversion processing such as mutual conversion between image data in millimeters and image data in inches. Note that, the resolution conversion unit 111 can execute scaling processing of image data as well. The coding and decoding unit 112 performs coding and decoding processing or performs scaling processing on the image data (uncompressed, MH, MR, MMR, JBIG, JPEG, and so on) treated by the MFP 100. The printing control unit 113 converts the image data into high-definition image data by performing various types of image processing such as smoothing processing, printing density correction processing, and color correction on the image data to be printed and then outputs the image data to the printing unit 114. Additionally, the printing control unit 113 also plays a role to regularly obtain state information data of the printing unit 114. The printing unit 114 is formed of a laser beam printer, an ink-jet printer, or the like and prints the image data generated by the printing control unit 113 on the printing medium such as a paper sheet.

The USB function control unit 115 performs protocol control according to the USB communication standard. The USB host control unit 116 is a control unit to establish communication based on the protocol specified by the USB communication standard. This USB communication standard is a standard for bidirectional high-speed data communication. According to this USB communication standard, it is specified that multiple hubs or functions (slaves) are connectable to a single host (master). In other words, the USB host control unit 116 provides a function as a host in the USB communication. The configurations other than the reading unit 107 and the LCD 109 are connected to each other through the bus 117.

Figure 3:
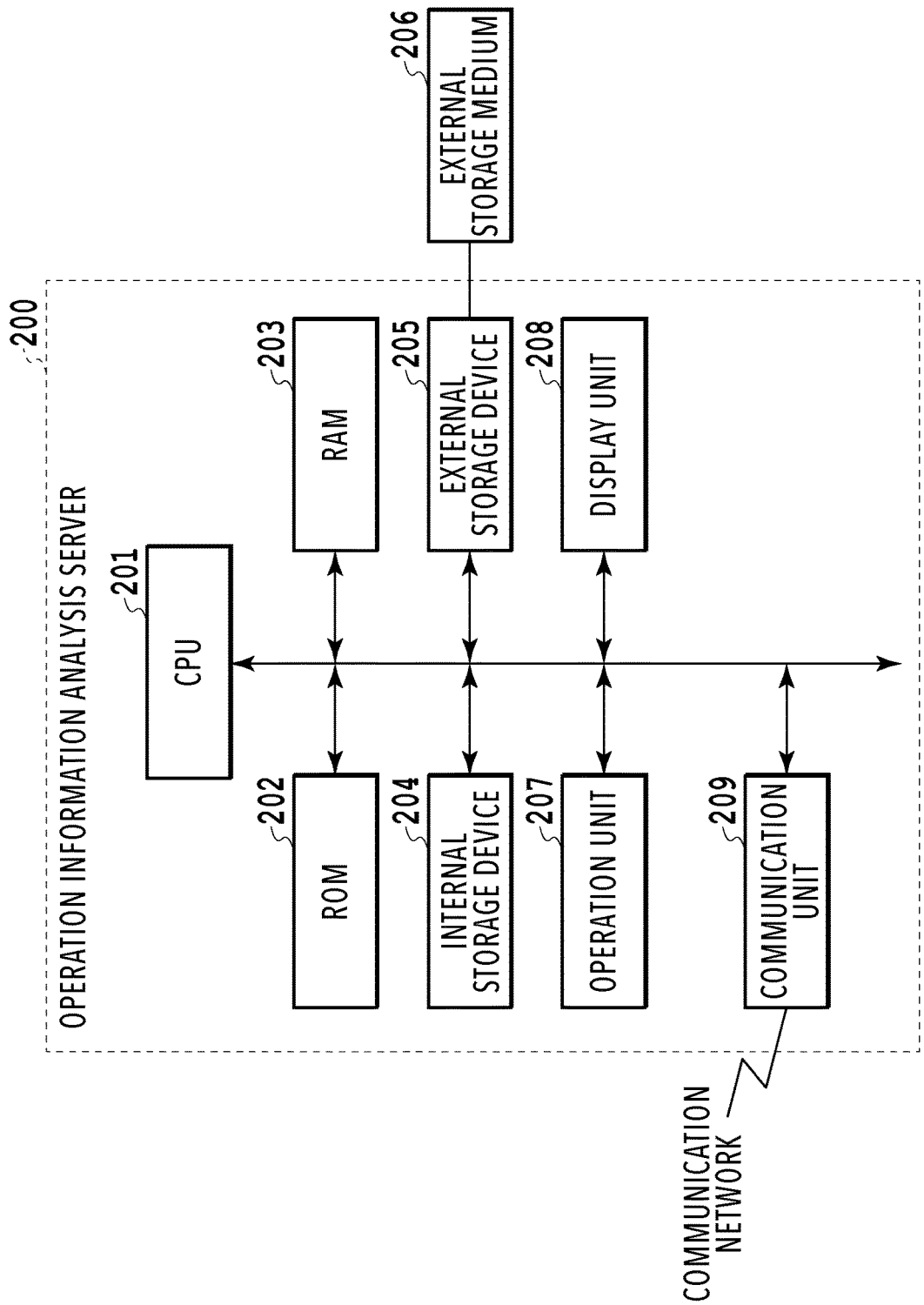
FIG. 3 is a block diagram illustrating a schematic configuration example of an operation information analysis server.

FIG. 3 is a block diagram illustrating a schematic configuration example of the operation information analysis server 200 in the present embodiment. The operation information analysis server 200 includes a CPU 201, a ROM 202, a RAM 203, an internal storage device 204, an external storage device 205, an operation unit 207, a display unit 208, and a communication unit 209.

The CPU 201 controls overall operations of the operation information analysis server 200 according to a program read from the ROM 202, the RAM 203, the internal storage device 204, or an external storage medium 206 to the external storage device 205. The ROM 202 stores a control program of the CPU 201 and the like. The RAM 203 temporarily stores the program and various data and operates the processing of the operation information analysis server 200 at high speed. The internal storage device 204 stores the operating system, various application programs, various data, and the like. Additionally, application software and the like for transmitting and receiving various control commands and data are installed in the internal storage device 204. The operation unit 207 is, for example, an input device such as a keyboard and a mouse and receives instruction input from an operator of the operation information analysis server 200. The display unit 208 performs various types of display to the operator. The communication unit 209 is connected to the communication network 300 and establishes the connection to the Internet service provider and establishes the communication of various data with the MFP 100. Note that, the connection to the communication network 300 is established by a publicly known method such as the HTTP or the XMPP.

Figure 4:
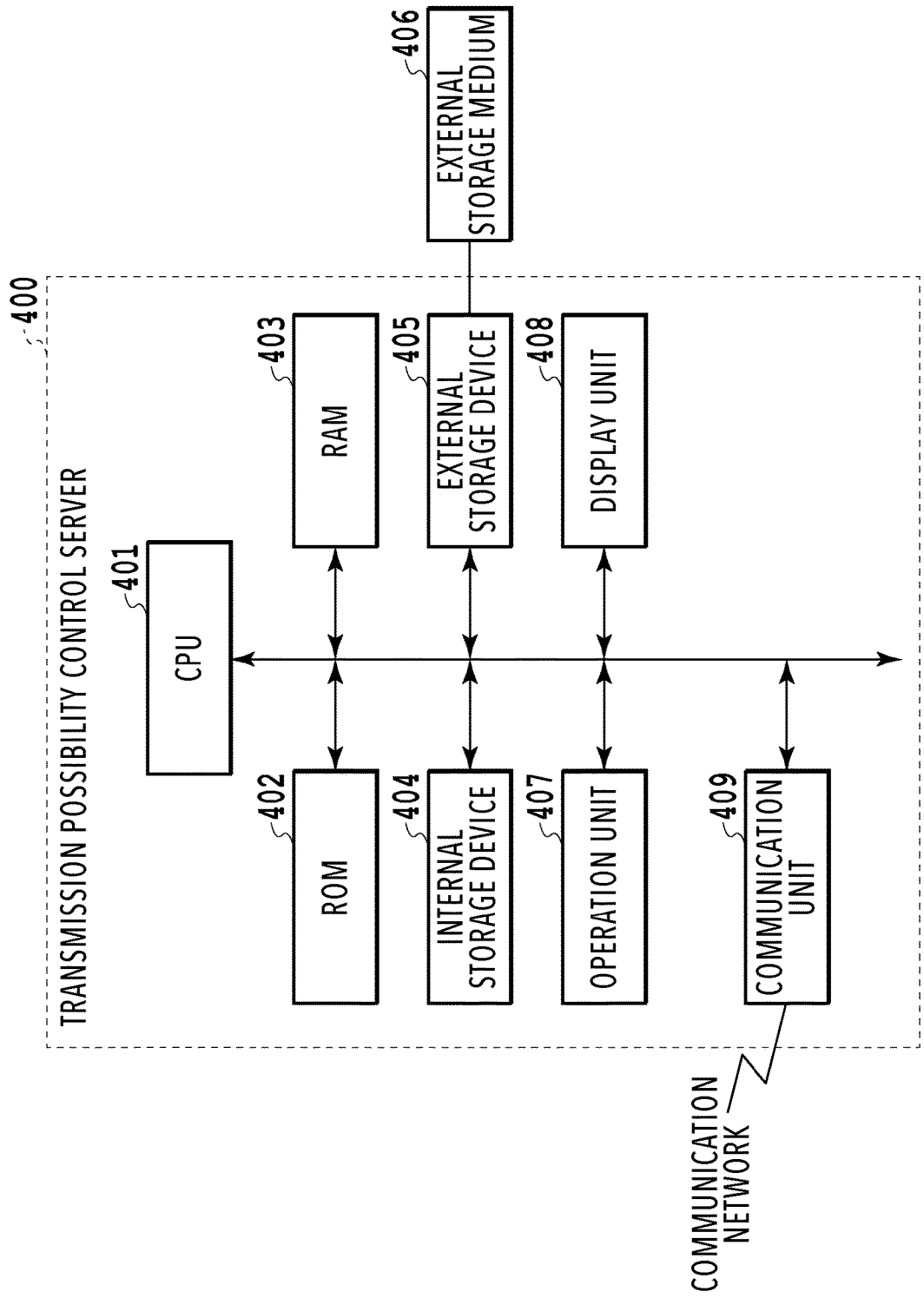
FIG. 4 is a block diagram illustrating a schematic configuration example of a transmission possibility control server.

FIG. 4 is a block diagram illustrating a schematic configuration example of the transmission possibility control server 400 in the present embodiment. The transmission possibility control server 400 includes a CPU 401, a ROM 402, a RAM 403, an internal storage device 404, an external storage device 405, an operation unit 407, a display unit 408, and a communication unit 409.

The CPU 401 controls overall operations of the transmission possibility control server 400 according to a program read from the ROM 402, the RAM 403, the internal storage device 404, or an external storage medium 406 to the external storage device 405. The ROM 402 stores a control program of the CPU 401 and the like. The RAM 403 temporarily stores the program and various data and operates the processing of the transmission possibility control server 400 at high speed. The internal storage device 404 stores the operating system, various application programs, various data, and the like. Additionally, application software and the like for transmitting and receiving various control commands and data are installed in the internal storage device 404. The operation unit 407 is, for example, an input device such as a keyboard and a mouse and receives instruction input from an operator of the transmission possibility control server 400. The display unit 408 performs various types of display to the operator. The communication unit 409 is connected to the communication network 300 and establishes the connection to the Internet service provider and establishes the communication of various data with the MFP 100. Note that, the connection to the communication network 300 is established by a publicly known method such as the HTTP or the XMPP.

<Transmission Possibility Information>

FIG. 5 is a diagram illustrating an example of the transmission possibility information. As described above, the transmission possibility information is information indicating whether it is possible (allowed) to transmit the operation information to the operation information analysis server 200. In the present embodiment, the transmission possibility information includes multiple types of setting items. Additionally, it is possible to designate whether to allow (ON) or deny (OFF) the transmission for each setting item. Thus, in the transmission possibility control server 400, it is unnecessary to prepare the transmission possibility information individually for each MFP (each information processing apparatus) as the control target, and it is possible to control the entire MFP with a single piece of information. Note that, the transmission possibility information of the present embodiment is not limited to such a mode, and a mode in which the information on each MFP is managed by the transmission possibility control server 400 and the transmission possibility information dedicated to the individual MFP is transmitted by the transmission possibility control server 400 may be applicable.

Each setting item in FIG. 5 is described. Model year indicates a season in which the product was released. Since a model that was released years ago may have different operational feeling from that of the current latest model, it may be unnecessary to collect the operation information. In the item of model year, it is possible to stop collecting the operation information by designating a value indicating OFF and a year of the model that does not need to collect the operation information. That is, it is possible to notify the MFP 100 of that the transmission of the operation information from the corresponding model is "denied". Additionally, it is also possible to designate a value indicating ON and a year of the model that needs to collect the operation information. For the setting items in FIG. 5, a configuration in which the MFP 100 processes the item with no designation to allow the transmission as default may be applicable, or a configuration in which the MFP 100 processes the item with no designation to deny the transmission as default may be applicable.

Panel type is a setting item for designating a type of a liquid crystal panel mounted in the MFP 100. For example, a value of color liquid crystal, monochrome liquid crystal, only lamp, and the like are designated. Since the operational feeling is different depending on the liquid crystal panel, in a case where it is demanded to collect the operation information on only a specific liquid crystal panel, it is possible to turn on the corresponding panel type.

Client ID indicates a character string that is unique to the MFP. A client ID is used for thinning out the MFP that transmits the operation information. As a value, a value indicating whether the client ID is an even number or an odd number is designated. For example, even if it is a model that allows the transmission based on another type of transmission possibility information, it is possible to deny the transmission from the device corresponding to the client ID. Thus, in the setting items, there may be provided an item that is applied with a higher priority than that of other setting items.

Forced off is used to stop the transmission from all the devices. In a case where the transmission of the operation information is demanded to be completely stopped for any reason, ON (in other words, transmission is "denied") is designated.

ON/OFF for each element is a setting item for controlling whether to perform the transmission for each element that performs the information transmission. For example, it is possible to control the transmission possibility of the operation information by a user interface (UI) or to control the transmission possibility of the operation information for each application.

Transmission possibility depending on a screen category is a setting item for controlling the transmission possibility of the operation information depending on a category of a screen being displayed. For example, in a case where the screen displayed on the operation display unit 108 of the MFP 100 is switched, a screen category allocated to the display screen and the corresponding screen category in the transmission possibility information are compared. If it is ON, the transmission of the operation information is "allowed". As a specific example, in a case where it is demanded to obtain information on copying, information on COPY_ON is designated. Then, the operation information on the screen related to copying is transmitted.

The transmission possibility information including each setting item described above is formed as binary data of 128 bytes, for example. Additionally, in a case where the bit allocated to each setting item is "1", it is processed such that the transmission is allowed, and in a case where the bit is "0", it is processed such that the transmission is denied. Note that, the example in FIG. 5 is merely an example, and the setting items and the data format are not limited to this example.

<Operation Information>

FIG. 6 is a diagram illustrating an example of the operation information transmitted from the MFP 100 to the operation information analysis server 200. The operation information includes multiple types of information. The multiple types of information includes information on the operation of the MFP 100 by the user and a value used in a case where the user operates the MFP 100. The value used in a case where the user operates the MFP 100 includes a value set in the MFP 100 as default and the value set by the user.

For example, the information on the operation of the MFP 100 by the user includes a screen ID. With the user operating the MFP 100, the screen displayed on the operation unit 207 is switched. With the screen ID displayed on the operation unit 207 being transmitted constantly by the MFP 100 to the operation information analysis server 200, it is possible to track the screen displayed on the MFP 100. Thus, the transition of the screen operation by the user is analyzed by the operation information analysis server 200. For example, in a case where a screen with the screen ID of ID_T0001 is displayed on the operation unit 207, the information on ID_T0001 is designated as the operation information.

Additionally, the value used in a case where the MFP 100 is operated (the value set by the user) includes a paper sheet type of paper sheet used in copying by the MFP 100, for example. The operation information on the paper sheet type is used to analyze for what purpose the user uses the MFP 100. For example, in a case where copying is performed with a postcard paper sheet, information on hagaki is designated as the operation information.

FIG. 6 exemplifies a type of the operation information. Screen ID is as described above. Additionally, the example of the postcard is included in information on a type of event as application for analyzing details of the operation performed by the user. In addition, there is also included information such as client ID that is the unique value indicating the MFP 100, language setting set in the MFP 100, and model indicating the release year of the printer.

In the present embodiment, the operation information is generated in the form of a query. For example, in a case of a query with the screen ID of ID_T0001, a query is generated by connecting screenId and ID_T0001 described in a tag name field in FIG. 6 with a sign of "=" and is saved into the RAM 103. Thus, the generated operation information is saved into the RAM 103. The query generated in this case is screenId=ID_T0001. Then, as described later, if it is possible to transmit the operation information at the timing to transmit the operation information, the operation information saved in the RAM 103 is transmitted to the operation information analysis server 200.

Additionally, in the present embodiment, in a case where there is already a saved query (operation information) in a saving area in the RAM 103 into which the operation information is saved, the operation information is generated by adding "&" to the end and thereafter adding the query. In other words, in a case where the paper sheet type is added as the operation information in a state in which the screen ID is already saved as described above, screenId=ID_T0001 & event=hagaki is generated. Then, the generated query is overwritten and saved into the saving area of the operation information in the RAM 103. Note that, in a case where no operation information is saved in the saving area of the operation information in the RAM 103, new operation information is generated by describing the query from the beginning and saved into the RAM 103. The operation information newly saved or overwritten and saved into the RAM 103 is transmitted to the operation information analysis server 200 and then deleted from the RAM 103.

Note that, the operation information illustrated in FIG. 6 is merely an example, and it is not limited thereto. Additionally, an example of adding the query is also an example, and it is not limited to this mode. Any mode may be applicable as long as it is a mode in which the operation information on the MFP 100 can be analyzed by the operation information analysis server 200.

<Sequence Example>

Figure 7:
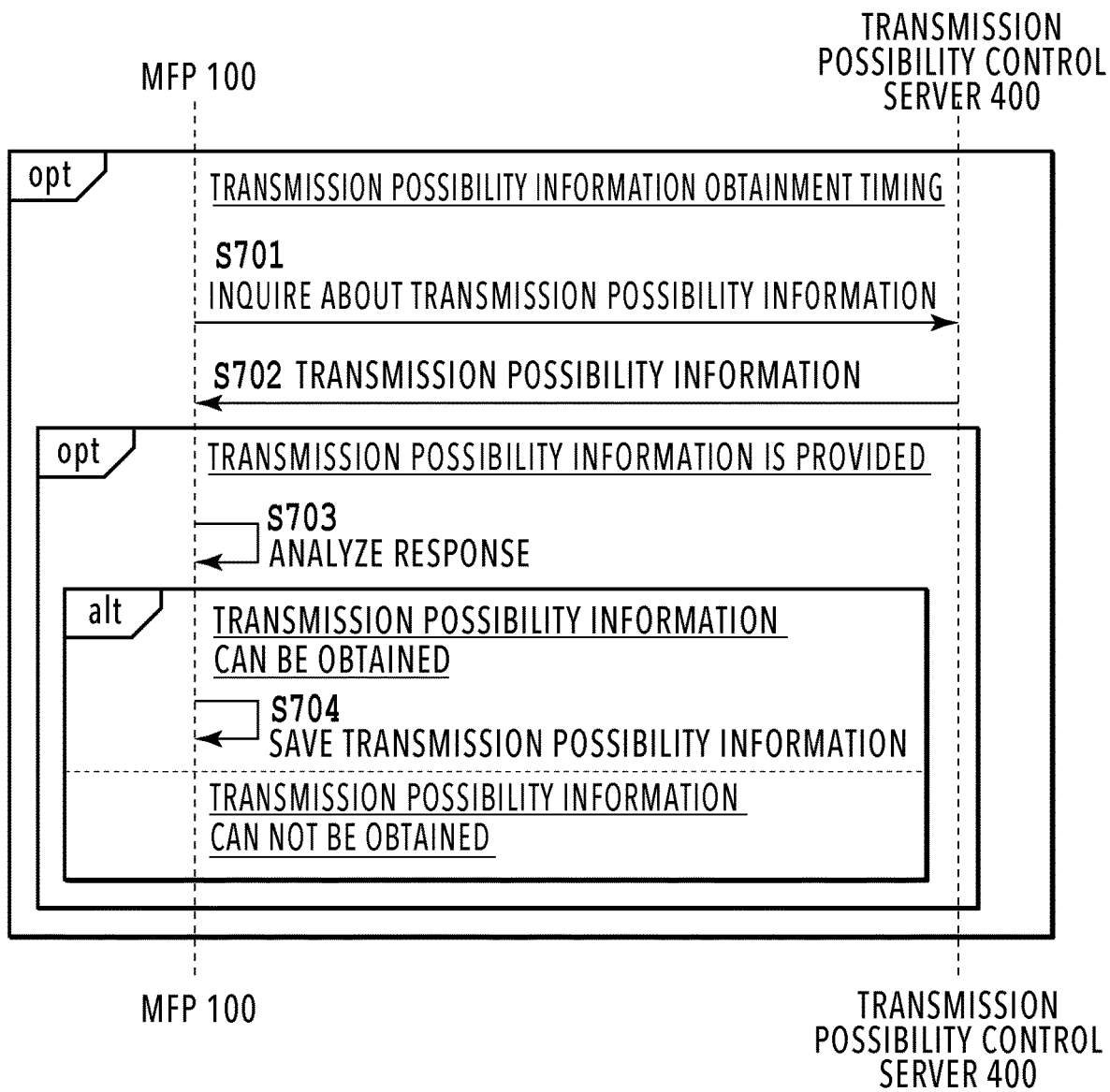
FIG. 7 is a sequence diagram illustrating an example of processing by the MFP to obtain the transmission possibility information.

FIG. 7 is a sequence diagram illustrating an example of processing to obtain the transmission possibility information from the transmission possibility control server 400 by the MFP 100. The processing by the MFP 100 illustrated in FIG. 7 is implemented with the CPU 101 of the MFP 100 deploying and executing the program stored in the ROM 102 to the RAM 103. The processing by the transmission possibility control server 400 illustrated in FIG. 7 is implemented with the CPU 401 of the transmission possibility control server 400 deploying and executing the program stored in the ROM 402 to the RAM 403. Thus, the processing illustrated in FIG. 7 is implemented by the CPU of each device. Note that, a part of or all the functions of steps of the MFP 100 and the transmission possibility control server 400 in FIG. 7 may be implemented by hardware such as an ASIC or an electronic circuit. A sign "S" in each description of the processing means that it is a step in the sequence diagram (hereinafter, the same applies to a sequence diagram and a flowchart diagram in the present specification).

FIG. 7 is a sequence diagram in which the MFP 100 performs processing to inquire of the transmission possibility control server 400 about the transmission possibility information triggered by reaching the transmission possibility information obtainment timing. In the present embodiment, the transmission possibility information obtainment timing is the completion of power-on and the end of job execution. Note that, the transmission possibility information obtainment timing is not limited thereto, and the transmission possibility information may be periodically obtained at certain intervals or may be another timing.

At the transmission possibility information obtainment timing, in S701, the MFP 100 transmits the inquiry about the transmission possibility information to the transmission possibility control server 400. That is, the MFP 100 transmits a request of the transmission possibility information to the transmission possibility control server 400. In S702, the transmission possibility control server 400 that receives the request transmits the transmission possibility information to the MFP 100.

In a case where the transmission possibility information is provided from the transmission possibility control server 400, in S703, the MFP 100 analyzes a response from the transmission possibility control server 400. The MFP 100 then determines whether the transmission possibility information can be obtained properly. For example, as described above, the transmission possibility information is formed as the binary data of 128 bytes. In a case where all the binary data can be obtained, the MFP 100 determines that the transmission possibility information can be obtained properly.

If the transmission possibility information can be obtained properly, in S704, the MFP 100 saves the transmission possibility information obtained from the transmission possibility control server 400 into the RAM 103. That is, the MFP 100 updates the transmission possibility information already saved in the RAM 103 to the obtained transmission possibility information. Note that, in a case where totally the same information as the transmission possibility information already obtained previously is obtained, the MFP 100 may either update or not update the transmission possibility information saved in the RAM 103 to the newly obtained transmission possibility information. The MFP 100 then ends the processing in the sequence diagram illustrated in FIG. 7.

On the other hand, if the transmission possibility information cannot be obtained, the MFP 100 performs no processing in this timing. That is, the MFP 100 does not perform the processing to save the transmission possibility information into the RAM 103. The MFP 100 then ends the processing in the sequence diagram illustrated in FIG. 7. As a result, the MFP 100 uses with no change the transmission possibility information that is already saved in the RAM 103 and used until just before. Note that, in a case where the transmission possibility information is never obtained before, the MFP 100 follows the initial setting. The initial setting is saved in the ROM 102, for example. In the present embodiment, in terms of the fail safe, the initial setting is set such that the MFP 100 does not transmit the operation information.

Figure 8:
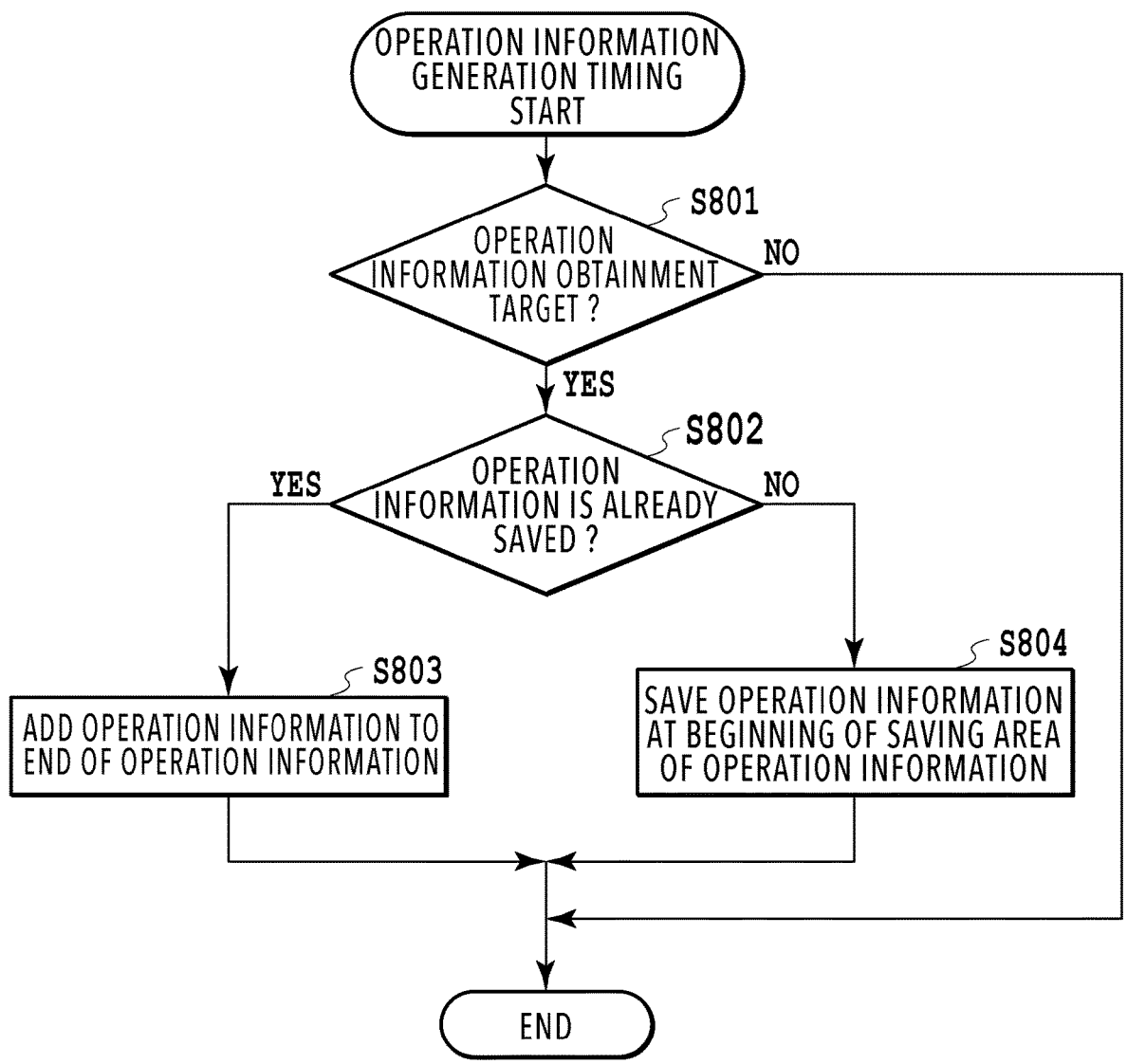
FIG. 8 is a flowchart illustrating an example of processing to generate the operation information.

FIG. 8 is a flowchart illustrating an example of processing to generate the operation information that is executed by the MFP 100. The processing by the MFP 100 illustrated in FIG. 8 is implemented with the CPU 101 of the MFP 100 deploying and executing the program stored in the ROM 102 to the RAM 103. The processing in FIG. 8 is processing executed by the MFP 100 at an operation information generation timing. The operation information generation timing is a timing at which a predetermined operation is performed. For example, the operation information generation timing is a timing at which an instruction to operate switching of the screen displayed on the display unit 208 is provided or a timing at which a predetermined operation instruction to operate the MFP 100 is provided. In addition, the processing in FIG. 8 may be executed at an arbitrary timing in accordance with the user operation.

At the operation information generation timing, in S801, the CPU 101 determines whether the operation that is a trigger of the processing in FIG. 8 is an operation as the operation information obtainment target. As described in the processing in FIG. 7, the MFP 100 saves the transmission possibility information in the RAM 103. Therefore, the CPU 101 refers to the transmission possibility information saved in the RAM 103 and determines whether the operation that is the trigger of the processing in FIG. 8 is the operation as the operation information obtainment target. If the operation that is the trigger of the processing in FIG. 8 is not the operation as the operation information obtainment target, the CPU 101 ends the processing in the flowchart in FIG. 8.

On the other hand, if the operation that is the trigger of the processing in FIG. 8 is the operation as the operation information obtainment target, the CPU 101 allows the process to proceed to S802. In S802, the CPU 101 determines whether there is the already saved operation information in the RAM 103. If it is determined that there is the already saved operation information in the RAM 103, in S803, the CPU 101 adds the operation information to the end of the already saved operation information. The CPU 101 then ends the processing in the flowchart in FIG. 8.

On the other hand, if it is determined that there is no already saved operation information in the RAM 103, in S804, the CPU 101 newly saves the operation information at the beginning of the saving area of the operation information. The CPU 101 then ends the processing in the flowchart in FIG. 8.

With the above processing, the MFP 100 generates the operation information according to the transmission possibility information and saves the operation information into the RAM 103. As described later, at the timing of transmitting the operation information to the operation information analysis server 200, the MFP 100 performs the processing to transmit the operation information saved in the RAM 103.

Figure 9:
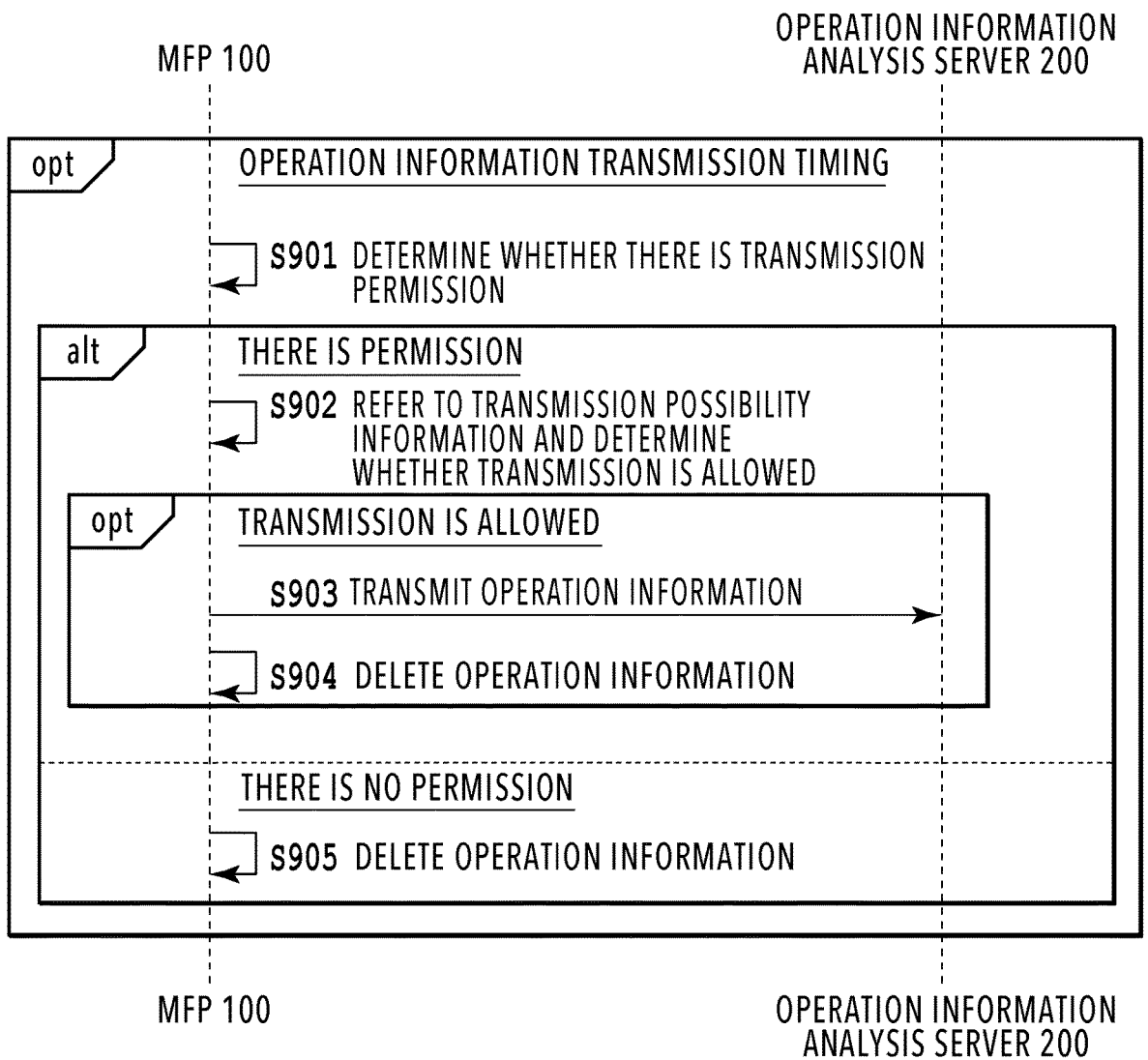
FIG. 9 is a sequence diagram of processing executed at an operation information transmission timing.

FIG. 9 is a sequence diagram of processing executed by the MFP 100 at the operation information transmission timing. The processing by the MFP 100 illustrated in FIG. 9 is implemented with the CPU 101 of the MFP 100 deploying and executing the program stored in the ROM 102 to the RAM 103. The processing by the operation information analysis server 200 illustrated in FIG. 9 is implemented with the CPU 201 of the operation information analysis server 200 deploying and executing the program stored in the ROM 202 to the RAM 203. In the present embodiment, the operation information transmission timing is the timing at which the screen displayed on the display unit 208 of the MFP 100 is switched. Note that, the operation information transmission timing is not limited to this example, and the transmission timing may arrive periodically at certain intervals or may be another timing.

At the operation information transmission timing, in S901, the MFP 100 refers to the permission information saved in the RAM 103 and determines whether there is the permission from the user to transmit the operation information. As described above, the permission information is information indicating whether there is the permission to transmit the various types of information including the operation information to the outside. The permission information is information set by the user of the MFP 100. For example, the permission information is set by the user in the first activation of the MFP 100. Note that, the setting of the permission information can be changed by the user at any timing.

If the permission information indicates that there is the permission from the user to transmit the information, in S902, the MFP 100 refers to the transmission possibility information. The MFP 100 then determines whether the transmission of the operation information is allowed. As described above, in the present embodiment, the MFP 100 refers to the transmission possibility information in the processing to generate the operation information, generates the operation information, and saves the operation information into the RAM 103. On the other hand, the operation information generation timing and the operation information transmission timing do not necessarily coincide with each other. Therefore, the MFP 100 refers to the transmission possibility information at the operation information transmission timing and determines whether the transmission of the operation information is allowed in the present embodiment as well.

If the transmission possibility information indicates that the transmission of the operation information is allowed, in S903, the MFP 100 transmits the operation information saved in the RAM 103 to the operation information analysis server 200. Subsequently, in S904, the MFP 100 deletes the operation information saved in the RAM 103. That is, the MFP 100 deletes the already-transmitted operation information from the RAM 103. Then, the processing in the sequence diagram in FIG. 9 ends. If the transmission possibility information indicates that the transmission of the operation information is denied, no processing is performed at this timing, and the processing in the sequence diagram in FIG. 9 ends.

On the other hand, if the permission information indicates that there is no permission from the user to transmit the information, in S905, the MFP 100 deletes the operation information saved in the RAM 103. Then, the processing in the sequence diagram in FIG. 9 ends.

Note that, in the present embodiment, the processing to generate the operation information in a case where the MFP 100 generates the operation information regardless of the contents of the permission information is described. Additionally, the example in which, if there is the permission at the timing at which the MFP 100 transmits the operation information, the operation information saved in the RAM 103 is deleted after the transmission is described. However, it is not limited to this example, and the processing to generate operation information may be performed by using the permission information. That is, the processing to determine whether the permission information indicates that there is the permission may be added to the processing in the beginning of FIG. 8. Additionally, a configuration in which, if it is indicated that there is the permission, the MFP 100 allows the process to proceed to S801, and if it is indicated that there is no permission, the MFP 100 ends the processing in the flowchart in FIG. 8 may be applicable.

As described above, according to the present embodiment, it is possible to properly transmit the operation information on the information processing apparatus to the server. That is, the MFP 100 as the information processing apparatus transmits the specific operation information to the operation information analysis server 200 according to the transmission possibility information received from the transmission possibility control server 400. In other words, the MFP 100 does not transmit all the pieces of operation information to the operation information analysis server 200 with no condition but transmits the operation information according to the transmission possibility information to the operation information analysis server 200. Thus, it is possible to reduce the data size of the operation information transmitted from the MFP 100 to the operation information analysis server 200. Therefore, it is possible to reduce the operational cost of the operation information analysis server 200. Additionally, it is possible to reduce also the communication cost from the MFP 100 to the operation information analysis server 200. Moreover, use of the operation information analysis server 200 makes it possible to change the operation information as the target and to prevent even the obtainment of the operation information without performing firmware update in the MFP 100. Therefore, it is possible to control the transmission of the operation information by the MFP 100 at a detailed and appropriate timing.

Second Embodiment

Figure 10:
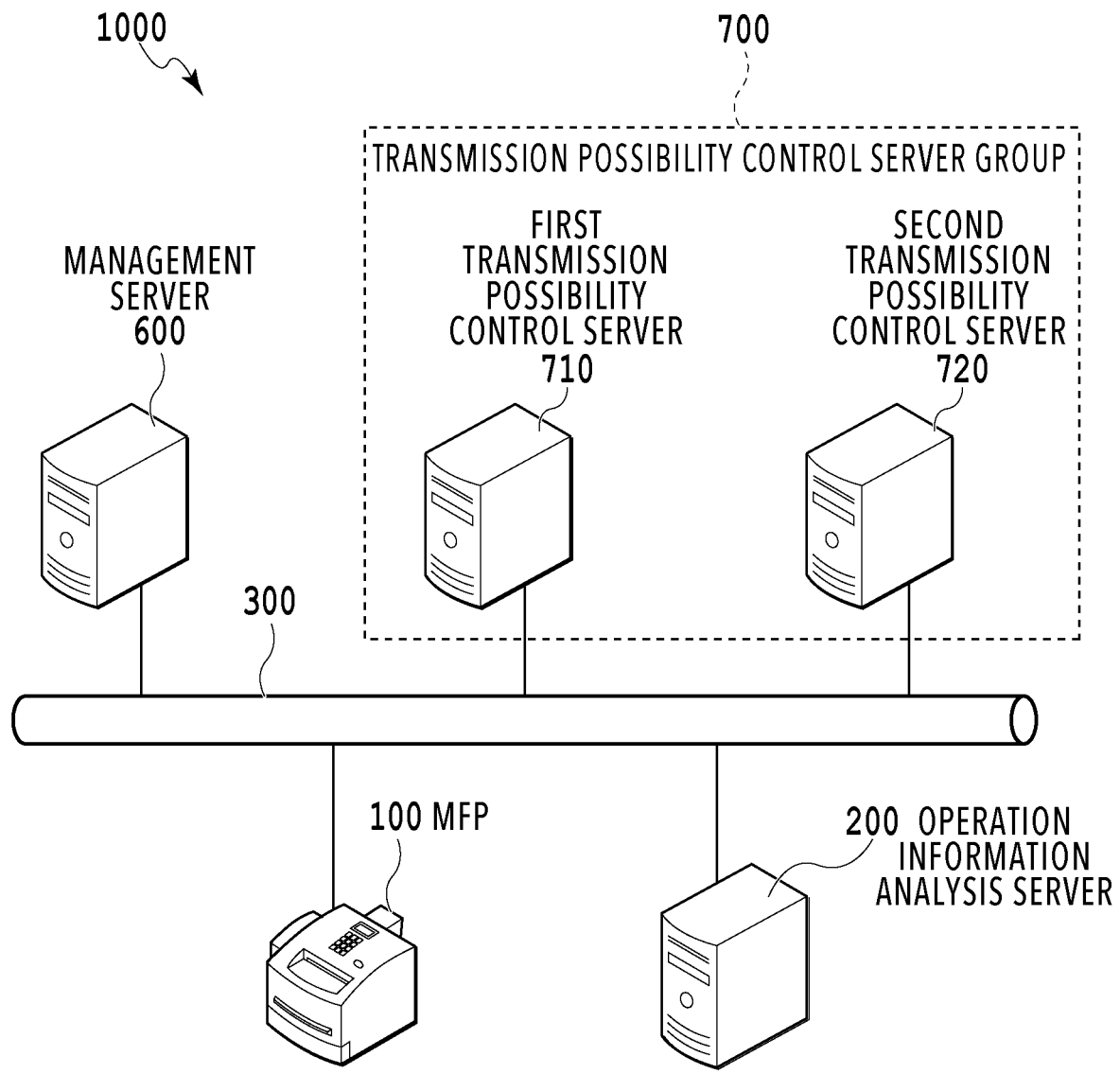
FIG. 10 is a diagram illustrating an overall configuration of an information processing system.

In the first embodiment, the example in which the MFP 100 obtains the transmission possibility information from the transmission possibility control server 400 and transmits the operation information according to the transmission possibility information to the operation information analysis server 200 is described. However, depending on a region, there is a region in which transmission of something like the operation information is never performed. For example, there is a region in which collection of this type of information is not allowed. Accordingly, the MFP 100 in the region is required to be controlled so as not to transmit the operation information. In the present embodiment, a system that controls whether the transmission possibility control server provides the transmission possibility information depending on the region in which the MFP 100 is disposed is described. Thus, it is possible to suppress the transmission of the operation information from the MFP 100 disposed in the region in which the transmission of the operation information is never performed. Hereinafter, a different point from the first embodiment is mainly described, and description of the common configuration with that of the first embodiment is omitted.
<System Configuration>
FIG. 10 is a diagram illustrating an overall configuration of an information processing system 1000 in the present embodiment. The information processing system 1000 in FIG. 10 is the information processing system 10 in FIG. 1 to which a management server 600 and a transmission possibility control server group 700 are added. The transmission possibility control server group 700 includes a first transmission possibility control server 710 and a second transmission possibility control server 720. Other configurations of the information processing system 1000 are similar to that of the information processing system 10 in FIG. 1.

The management server 600 is a server that manages the transmission possibility control server. The transmission possibility control server group 700 is a general term for the transmission possibility control server that is disposed in each region and provides the transmission possibility information. In the example in FIG. 10, the first transmission possibility control server 710 disposed in a first region and the second transmission possibility control server 720 disposed in a second region are illustrated. Note that, as described in the first embodiment, although the servers are each a single server device in the example in FIG. 10, a physical device example is not limited to this example. The function that each server individually has may be implemented by multiple physical servers or may be constructed as a virtual server in a cloud service. Additionally, the function individually implemented by each server may be implemented by a single server. The configurations itself of the first transmission possibility control server 710 and the second transmission possibility control server 720 are similar to that of the transmission possibility control server 400 described in the first embodiment. Additionally, the configuration of the management server 600 may be a similar configuration as that of the transmission possibility control server 400 or the operation information analysis server 200 described in the first embodiment, and a main different point is that the program mounted in the ROM and the like is different; for this reason, description is omitted.
<Overview of System>
An overview of processing performed by the information processing system 1000 in the present embodiment is described. In the present embodiment, the MFP 100 obtains from the management server 600 server information indicating the transmission possibility control server as the target to which the transmission possibility information is requested. The MFP 100 then inquires of the transmission possibility control server indicated by the server information about the transmission possibility information. Subsequent processing is similar to the processing described in the first embodiment.

In the present embodiment, provision of multiple transmission possibility control servers makes it possible to perform control in a case where there is access from a region in which the transmission of the operation information is never performed. For example, it is assumed that the first transmission possibility control server 710 is a server of the first region in which the transmission of the operation information is allowed, and the second transmission possibility control server 720 is a server of the second region in which the transmission of the operation information is never performed. The first transmission possibility control server 710 is formed so as to provide the transmission possibility information. On the other hand, the second transmission possibility control server 720 is formed so as not to provide the transmission possibility information.

Under the circumstances, in a case where the MFP 100 inquires of the management server 600 from the first region, the management server 600 provides the server information on the first transmission possibility control server 710. According to the provided server information, the MFP 100 inquires of the first transmission possibility control server 710 about the transmission possibility information and transmits the operation information by using the provided transmission possibility information.

Figure 11B:
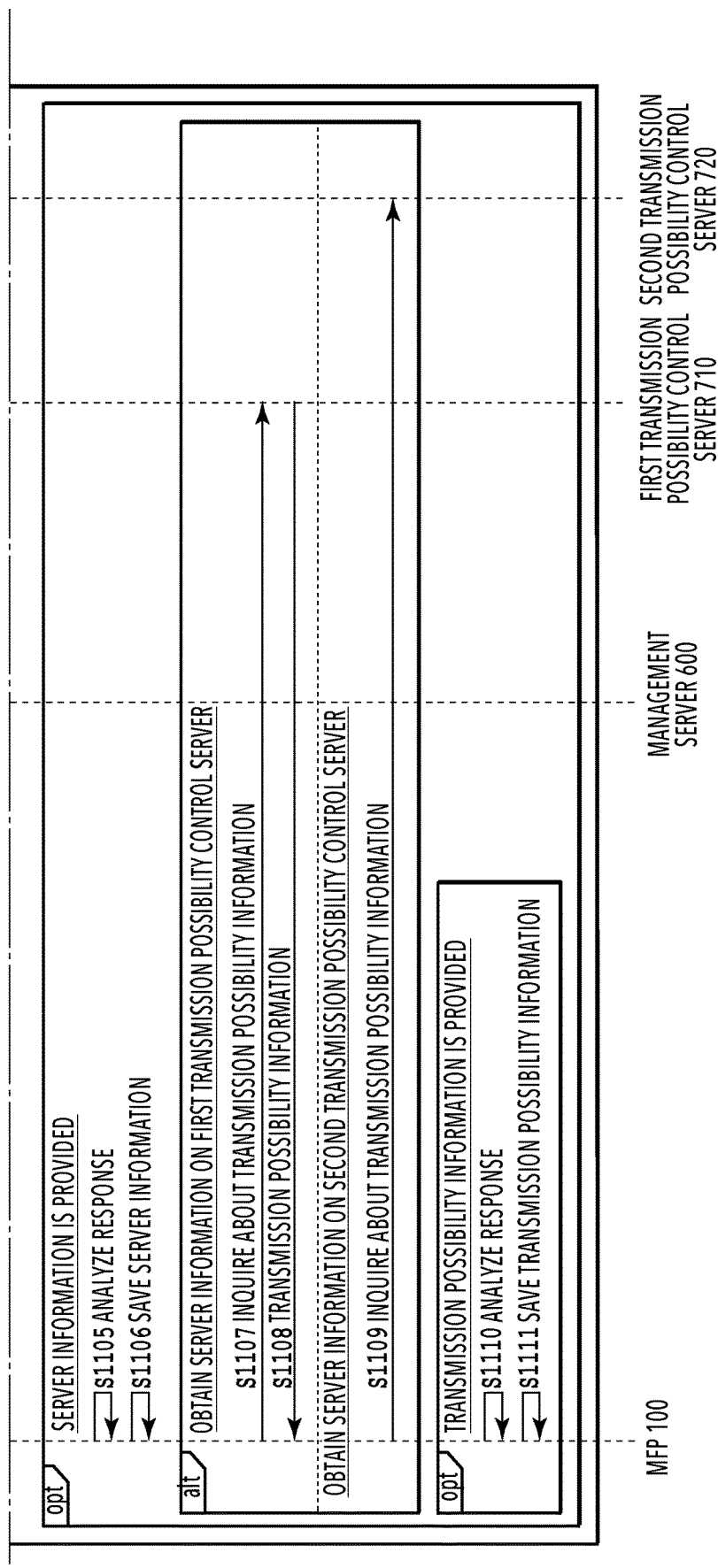

On the other hand, in a case where the MFP 100 inquires of the management server 600 from the second region, the management server 600 provides the server information on the second transmission possibility control server 720. According to the provided server information, the MFP 100 inquires of the second transmission possibility control server 720 about the transmission possibility information; however, the second transmission possibility control server 720 provides no transmission possibility information. Accordingly, the MFP 100 cannot transmit the operation information. As a result, it is possible to suppress the transmission of the operation information from the MFP 100 in the region in which the transmission of the operation information is never performed.
<Sequence Example>
FIGS. 11A and 11B are totally a sequence diagram illustrating an example of the processing by the MFP 100 to obtain the transmission possibility information from the transmission possibility control server. The processing by the MFP 100 illustrated in FIGS. 11A and 11B is implemented with the CPU 101 of the MFP 100 deploying and executing the program stored in the ROM 102 to the RAM 103. The processing by the management server 600, the first transmission possibility control server 710, and the second transmission possibility control server 720 illustrated in FIGS. 11A and 11B is implemented with the CPU 401 of each server deploying and executing the program stored in the ROM 402 to the RAM 403.

FIGS. 11A and 11B are totally a sequence diagram in which the MFP 100 performs the processing to inquire of the management server 600 about the transmission possibility information triggered by reaching the transmission possibility information obtainment timing. In the present embodiment, the transmission possibility information obtainment timing is the completion of power-on and the end of job execution. Note that, the transmission possibility information obtainment timing is not limited thereto, and the transmission possibility information may be periodically obtained at certain intervals or may be another timing.

At the transmission possibility information obtainment timing, in S1101, the MFP 100 transmits the inquiry about the server information to the management server 600. That is, the MFP 100 transmits to the management server 600 a request of the server information indicating the server as the target to which the MFP 100 should request the transmission possibility information. In response to this request, in S1102, the management server 600 determines the region in which the MFP 100 that transmits the request is disposed. In the present embodiment, the management server 600 determines the region in which the MFP 100 is disposed based on an IP address of the MFP 100. If the IP address of the MFP 100 indicates the region in which the transmission of the operation information is performed, in S1103, the management server 600 provides the server information on the first transmission possibility control server 710. If the IP address of the MFP 100 indicates the region in which the transmission of the operation information is never performed, in S1104, the management server 600 provides the server information on the second transmission possibility control server 720. If the IP address of the MFP 100 indicates another region, the management server 600 provides no server information.

If the management server 600 provides the server information, in S1105, the MFP 100 analyzes the response from the management server 600. In S1106, the MFP 100 then saves the server information into the RAM 103. In a case where the server information is already saved in the RAM 103, the server information is overwritten and saved, and the server information is updated.

Next, if the obtained server information indicates the first transmission possibility control server 710, in S1107, the MFP 100 inquires of the first transmission possibility control server 710 about the transmission possibility information. In S1108, the first transmission possibility control server 710 that receives the inquiry provides the transmission possibility information to the MFP 100.

On the other hand, if the obtained server information indicates the second transmission possibility control server 720, in S1109, the MFP 100 inquires of the second transmission possibility control server 720 about the transmission possibility information. Note that, as described above, since the second transmission possibility control server 720 is formed so as not to transmit the transmission possibility information, the second transmission possibility control server 720 provides no transmission possibility information.

If the transmission possibility control server provides the transmission possibility information (that is, there is a response), in S1110, the MFP 100 analyzes the response. Then, in S1111, the MFP 100 saves the transmission possibility information into the RAM 103 and updates the transmission possibility information. Then, the processing in the sequence diagram in FIGS. 11A and 11B ends.

Subsequent processing is similar to the example described in the first embodiment. That is, the MFP 100 uses the obtained transmission possibility information, performs the processing to generate the operation information as illustrated in FIG. 8, and transmits the operation information as illustrated in FIG. 9.

Note that, although an example in which the IP address of the MFP 100 is used to determine the transmission possibility control server in the management server 600 is described in the present embodiment, it is not limited thereto. It is also possible to determine the transmission possibility control server that should respond to the MFP 100 that makes the request by using any other information.

As described above, according to the present embodiment, it is possible to suppress the transmission of the operation information from the MFP 100 in the region in which the transmission of the operation information is never performed.

Third Embodiment

In the first embodiment, an example in which, in a case where the MFP 100 cannot obtain the transmission possibility information from the transmission possibility control server 400, the transmission possibility information that is obtained by the MFP 100 from the transmission possibility control server 400 and saved in the RAM 103 previously is used is described. In this case, there is also assumed a case where the MFP 100 cannot continuously obtain the transmission possibility information. In such a case, there is a possibility that the MFP 100 transmits the operation information with reference to the transmission possibility information that is not initially intended by a system manager.

To deal with this, in the present embodiment, an example in which an expiration date is set in the transmission possibility information to suppress the transmission of the operation information according to the old transmission possibility information is described. In a case of generating the operation information and in a case of transmitting the operation information, the MFP 100 refers to the expiration date of the transmission possibility information, and if the expiration date has passed, the MFP 100 deletes the operation information. Thus, it is possible to suppress the transmission of the unintended operation information using the old transmission possibility information.

The basic system configuration of the present embodiment is similar to the example described in the first embodiment; for this reason, description is omitted. Hereinafter, a different point from the first embodiment is mainly described. Note that, the present embodiment may be based on the system configuration described in the second embodiment.

<Transmission Possibility Information>

FIG. 12 is a diagram illustrating an example of the transmission possibility information in the present embodiment. The transmission possibility information in FIG. 12 illustrates an example in which the setting item of the expiration date is added to the transmission possibility information in FIG. 5. The transmission possibility information after the expiration date cannot be used. A method of designating the expiration date may be designating clock time or the elapsed time after obtaining the transmission possibility information, or another method may be applicable. For example, in a case where the clock time is designated, 2021/12/16 is designated.

Sequence Diagram

Figure 13:
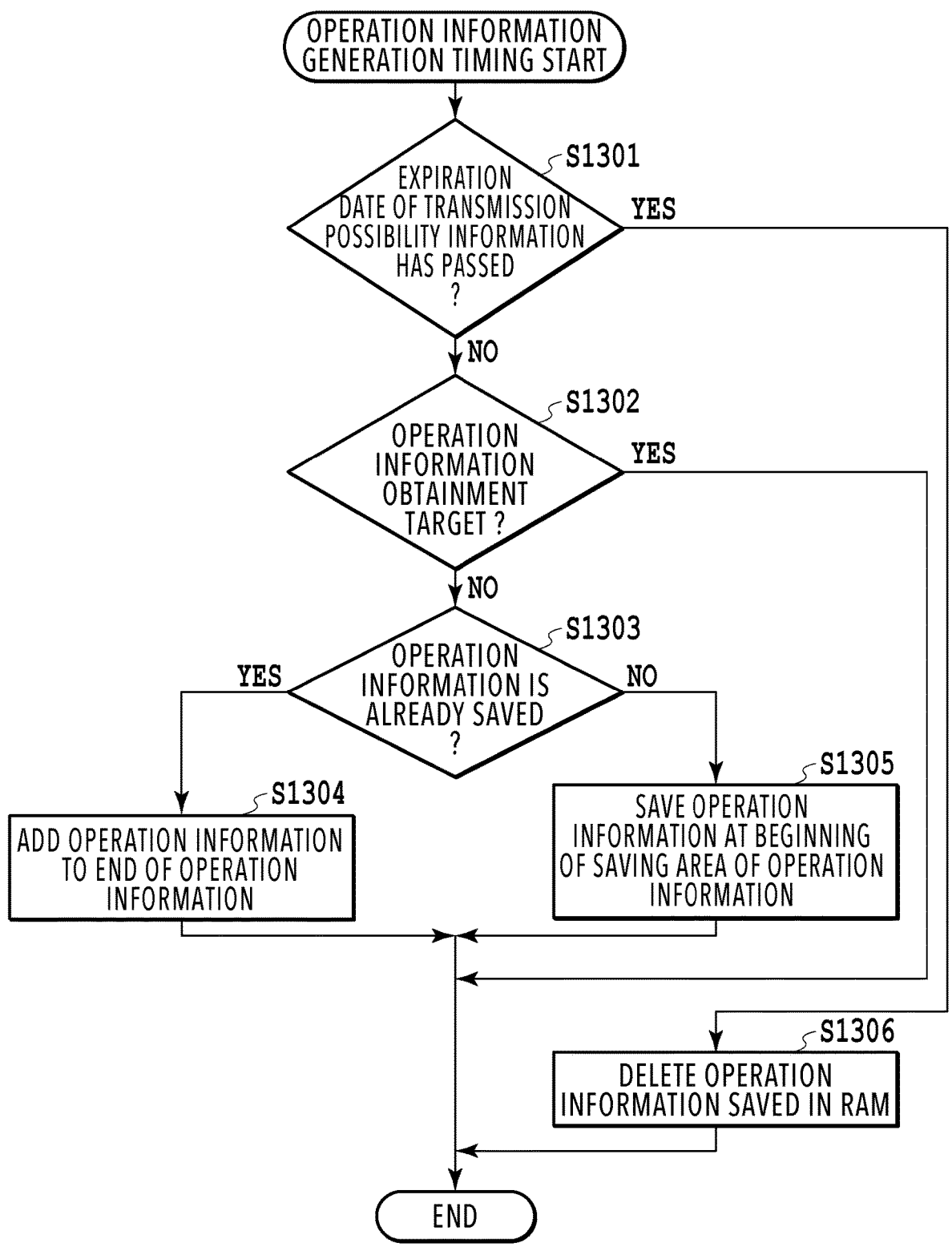
FIG. 13 is a flowchart illustrating an example of processing to generate the operation information.

FIG. 13 is a flowchart illustrating an example of processing to generate the operation information executed by the MFP 100. The processing by the MFP 100 illustrated in FIG. 13 is the processing illustrated in FIG. 8 that is changed partially. Basic description is similar to FIG. 8; for this reason, a different point is mainly described.

At the operation information generation timing, in S1301, the MFP 100 refers to the transmission possibility information saved in the RAM 103 and determines whether the expiration date has passed. If it is determined that the expiration date has passed, the process proceeds to S1306, and the MFP 100 deletes the operation information saved in the RAM 103. Then, the processing in the sequence diagram in FIG. 13 ends. If it is determined that the expiration date has not passed, the MFP 100 allows the process to proceed to S1302. The processing from S1302 to S1305 is the same as the processing from S801 to S804 in FIG. 8.

Figure 14:
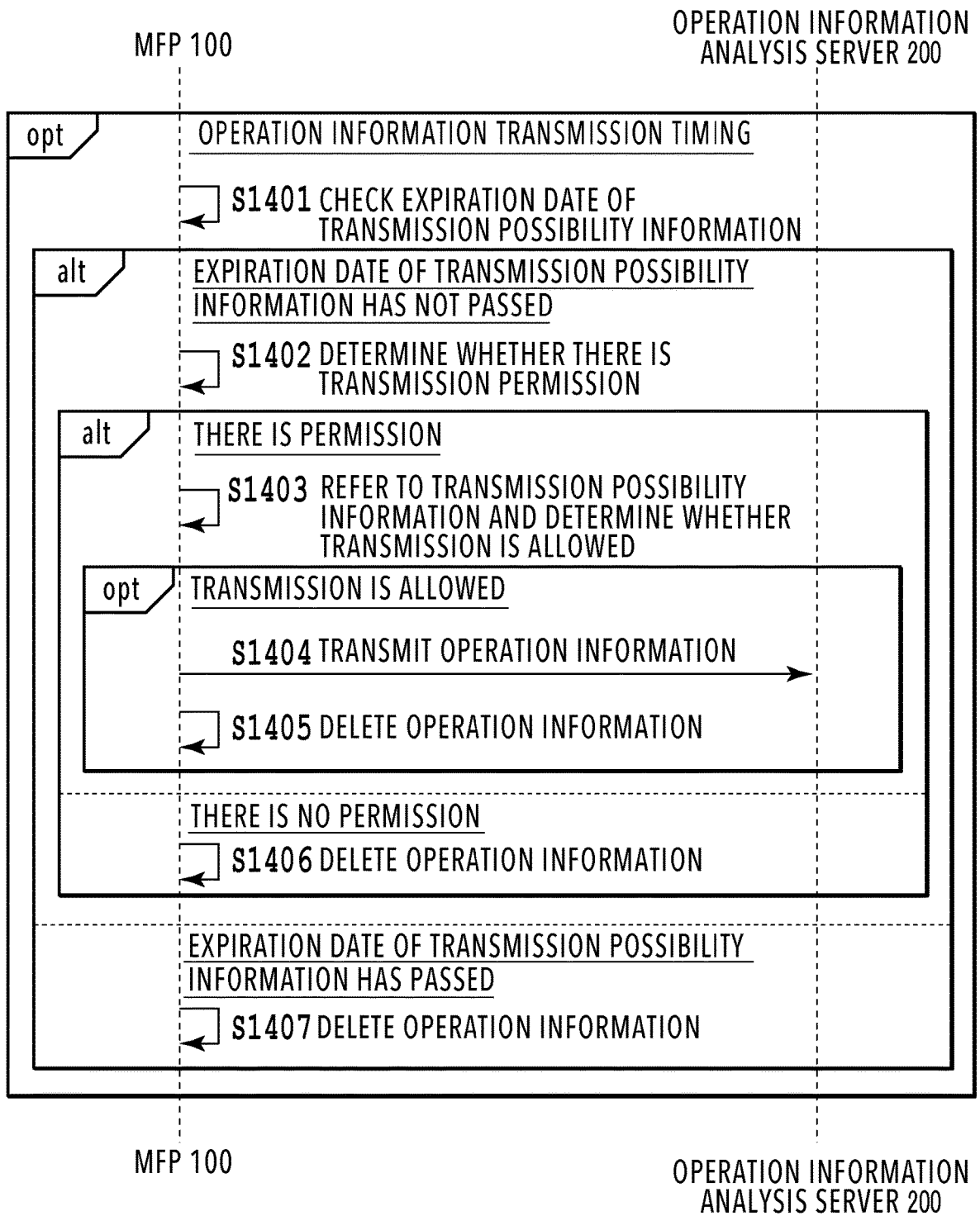
FIG. 14 is a sequence diagram of processing executed at the operation information transmission timing.

FIG. 14 is a sequence diagram of processing executed by the MFP 100 at the operation information transmission timing. The processing by the MFP 100 illustrated in FIG. 14 is the processing illustrated in FIG. 9 that is changed partially. Basic description is similar to FIG. 9; for this reason, a different point is mainly described.

At the operation information transmission timing, in S1401, the MFP 100 checks the expiration date of the transmission possibility information. The MFP 100 refers to the transmission possibility information saved in the RAM 103, and if the expiration date has passed, in S1407, the MFP 100 deletes the operation information saved in the RAM 103. Then, the processing in the sequence diagram illustrated in FIG. 14 ends. On the other hand, if the expiration date has not passed, the MFP 100 performs the processing in and after S1402. The processing from S1402 to S1406 is the same as the processing from S901 to S905 in FIG. 9; for this reason, description is omitted.

As described above, according to the present embodiment, setting of the expiration date in the transmission possibility information makes it possible to suppress the transmission of the operation information according to the old transmission possibility information.

Fourth Embodiment

In the first embodiment, an example in which, in a case where the MFP 100 cannot obtain the transmission possibility information from the transmission possibility control server 400, the transmission possibility information that is obtained by the MFP 100 from the transmission possibility control server 400 and saved in the RAM 103 previously is used is described. In this case, as described in the third embodiment, there is also assumed a case where the MFP 100 cannot continuously obtain the transmission possibility information. In such a case, there is a possibility that the MFP 100 transmits the operation information with reference to the transmission possibility information that is not initially intended by the system manager.

To deal with this, in the present embodiment, in a case where the MFP 100 fails in obtaining the transmission possibility information from the transmission possibility control server 400, the MFP 100 deletes the operation information and the transmission possibility information saved in the RAM 103. Thus, it is possible to suppress the transmission of the unintended operation information using the old transmission possibility information.

Since the basic system configuration is similar to the example described in the first embodiment, description is omitted. Hereinafter, a different point from the first embodiment is mainly described. Note that, the present embodiment may be based on the system configuration described in the second embodiment.

<Sequence Diagram>

Figure 15:
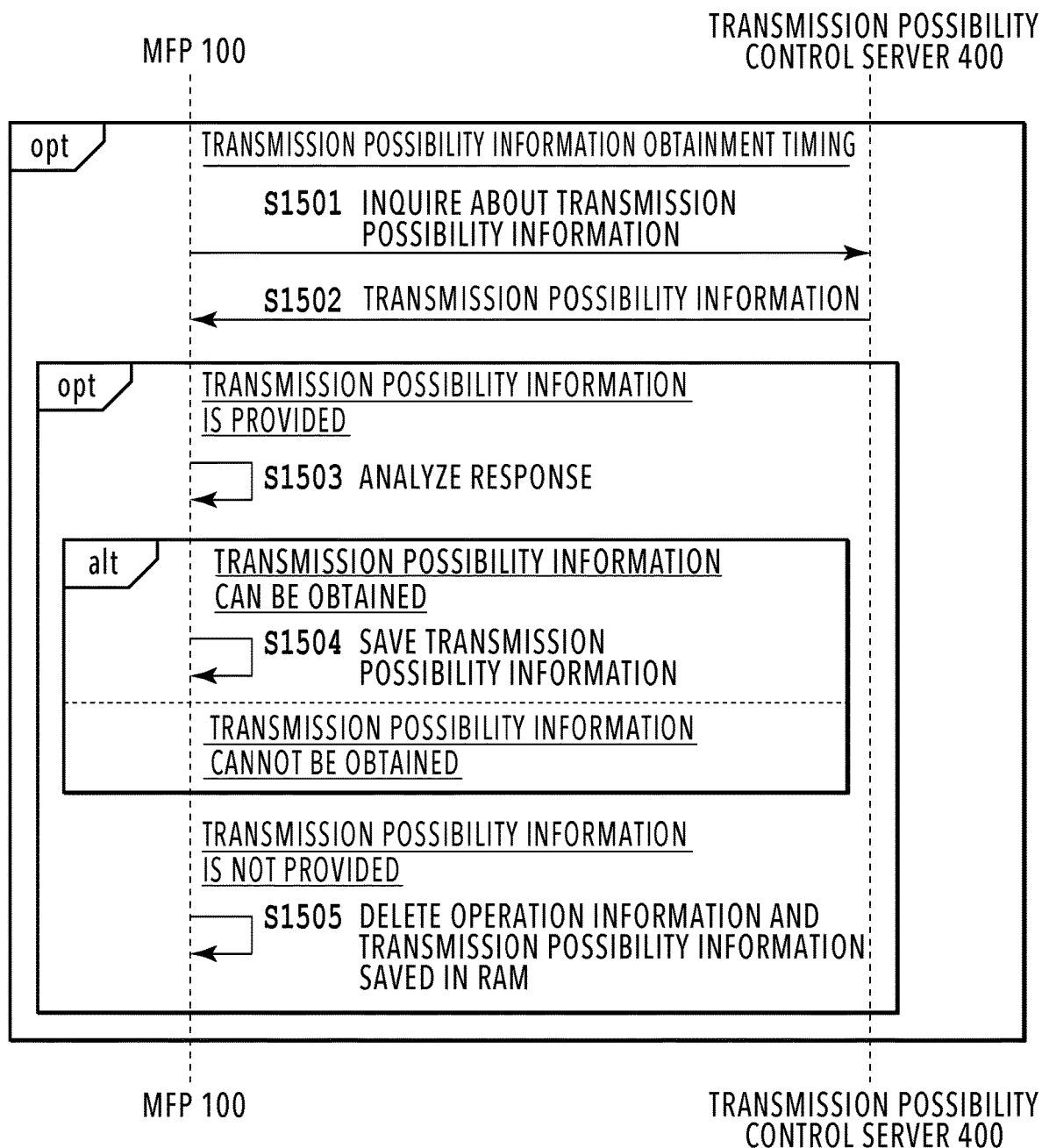
FIG. 15 is a sequence diagram illustrating an example of the processing by the MFP to obtain the transmission possibility information.

FIG. 15 is a sequence diagram illustrating an example of the processing by the MFP 100 to obtain the transmission possibility information from the transmission possibility control server. The processing in FIG. 15 is basically similar to the processing described in FIG. 7; for this reason, a different point is mainly described.

The processing from S1501 to S1504 is similar to the processing from S701 to S704. In the present embodiment, in response to an inquiry about the transmission possibility information in S1501, if the transmission possibility information is not provided from the transmission possibility control server 400, in S1505, the MFP 100 deletes the operation information and the transmission possibility information saved in the RAM 103. That is, the MFP 100 performs processing to restore the transmission possibility information to the initial setting of the MFP 100. Then, the processing in the sequence diagram in FIG. 15 ends. As described also in the first embodiment, in the present embodiment, the MFP 100 is formed so as not to transmit the operation information under the initial setting where the transmission possibility information is not obtained from the transmission possibility control server 400. Therefore, in a case where the obtainment of the transmission possibility information is failed, substantially, the processing is not performed in the generation of the operation information and in the transmission of the operation information.

As described above, according to the present embodiment, in a case where the obtainment of the transmission possibility information is failed, the operation information is not transmitted, and thus it is possible to suppress the transmission of the unintended operation information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-171422, filed Oct. 26, 2022 which is hereby incorporated by reference herein in its entirety.

What is claimed is:

1. An image processing apparatus communicable with a first server and a second server, comprising:
at least one processor and at least a memory coupled to the at least one processor and having instructions stored thereon, and when executed by the at least one processor, acting as:
an obtainment unit configured to obtain, from the first server, transmission possibility information indicating transmission possibility of operation information on the image processing apparatus, wherein the transmission possibility information of the operation information is set in the first server according to a screen category displayed on the image processing apparatus; and
a control unit configured to perform control to transmit operation information in a screen category corresponding to the allowance of the transmission to the second server on a condition that the obtained transmission possibility information indicates the transmission is allowed,
wherein, in the first server, the transmission possibility information is set for each model year and each panel type.

2. The image processing apparatus according to claim 1, wherein
the control unit generates the operation information on the information processing apparatus and transmits the generated operation information to the second server.

3. The image processing apparatus according to claim 2, wherein
the operation information is generated based on the transmission possibility information.

4. The image processing apparatus according to claim 2, wherein
the operation information is transmitted based on the transmission possibility information.

5. The image processing apparatus according to claim 2, wherein
the generated operation information is stored into a storage unit, and
the operation information stored in the storage unit is transmitted.

6. The image processing apparatus according to claim 5, wherein
in a case where the operation information is transmitted to the second server, the control unit deletes the operation information stored in the storage unit.

7. The image processing apparatus according to claim 5, wherein
the transmission possibility information includes an expiration date, and
in a case where the expiration date included in the transmission possibility information has passed, the control unit deletes the operation information stored in the storage unit without transmitting the operation information stored in the storage unit to the second server.

8. The image processing apparatus according to claim 1, wherein
in a case where the obtainment unit cannot obtain the transmission possibility information from the first server, the control unit performs the control by using transmission possibility information obtained from the first server previously.

9. The image processing apparatus according to claim 1, wherein
in a case where the obtainment unit cannot obtain the transmission possibility information from the first server, the control unit does not transmit the operation information to the second server.

10. The image processing apparatus according to claim 1, wherein
the obtainment unit obtains, from a third server, server information indicating the first server from which the transmission possibility information is obtained, and obtains the transmission possibility information from the first server indicated by the server information.

11. The image processing apparatus according to claim 1, wherein
the transmission possibility information includes a plurality of setting items.

12. The image processing apparatus according to claim 11, wherein
the plurality of setting items include a setting item that controls the transmission possibility with a higher priority than that of another setting item.

13. A method of controlling an image processing apparatus communicable with a first server and a second server, comprising:
obtaining, from the first server, transmission possibility information indicating transmission possibility of operation information on the image processing apparatus, wherein the transmission possibility information of the operation information is set in the first server according to a screen category displayed on the image processing apparatus;
performing control to transmit operation information in a screen category corresponding to the allowance of the transmission to the second server on a condition that the obtained transmission possibility information indicates the transmission is allowed; and
setting, in the first server, the transmission possibility information for each model year and each panel type.

14. A system comprising a first server and an image processing apparatus communicable with the first server and a second server:
with the first server comprising at least one processor and at least a memory coupled to the at least one processor and having instructions stored thereon, and when executed by the at least one processor, acting as:
a setting unit configured to set transmission possibility information indicating transmission possibility of operation information on the image processing apparatus, wherein the transmission possibility information of the operation information is set according to a screen category displayed on the image processing apparatus, and the transmission possibility information is set for each model year and each panel type; and
a transmission unit configured to transmit the transmission possibility information to the image processing apparatus;

the image processing apparatus comprising:

at least one processor and at least a memory coupled to the at least one processor and having instructions stored thereon, and when executed by the at least one processor, acting as:

an obtainment unit configured to obtain the transmission possibility information from the first server; and a control unit configured to perform control to transmit operation information in a screen category corresponding to the allowance of the transmission to the second server on a condition that the obtained transmission possibility information indicates the transmission is allowed.

15. The system according to claim 14, wherein the setting unit sets the transmission possibility information in a screen on copying, and the control unit performs control to transmit operation information in the screen on copying to the second server in a case where the transmission possibility information in the screen on copying indicates the transmission is allowed.

16. The system according to claim 14, wherein the setting unit sets the transmission possibility information for each application.

17. The system according to claim 14, wherein the control unit determines whether there is permission from a user to transmit the operation information to an outside and performs control to transmit the operation information to the second server in a case there is the permission from the user, and performs control not to transmit the operation information to the second server in a case there is no permission from the user.

* * * * *